United States Patent [19]

Hamano et al.

[11] Patent Number: 5,737,634
[45] Date of Patent: Apr. 7, 1998

[54] STORAGE DEVICE CONTROL SYSTEM WITH AN INTERNAL BUS WHEREIN A NETWORK INTERFACE HAS A DATA LINE FOR MEMORY TRANSFER

[75] Inventors: Takashi Hamano; Tsutomu Togo; Hiroichi Egawa; Yasushi Inamoto; Kiichi Matsuda, all of Kawasaki, Japan

[73] Assignee: Fujitsu Limited, Kanagawa, Japan

[21] Appl. No.: 554,695

[22] Filed: Nov. 7, 1995

[30] Foreign Application Priority Data

Nov. 28, 1994 [JP] Japan .................................. 6-292922

[51] Int. Cl.⁶ ............................................ G06F 13/14
[52] U.S. Cl. .............................. 395/847; 395/200.14
[58] Field of Search .................. 395/200.07, 200.15, 395/308, 847, 427

[56] References Cited

U.S. PATENT DOCUMENTS

| | | | |
|---|---|---|---|
| 4,455,620 | 6/1984 | Watanabe et al. ...................... | 395/847 |
| 5,099,417 | 3/1992 | Magar et al. .......................... | 395/847 |
| 5,276,845 | 1/1994 | Takayama ............................. | 395/847 |
| 5,315,696 | 5/1994 | Case et al. ............................ | 395/133 |
| 5,430,844 | 7/1995 | Shitara et al. ........................ | 395/846 |
| 5,432,910 | 7/1995 | Barker et al. ....................... | 395/200.1 |
| 5,488,724 | 1/1996 | Firoozmand ..................... | 395/200.07 |
| 5,513,332 | 4/1996 | Wimer et al. ......................... | 395/427 |
| 5,586,263 | 12/1996 | Katsumata et al. ................ | 395/200.07 |

*Primary Examiner*—Tod R. Swann
*Assistant Examiner*—Christopher S. Chow
*Attorney, Agent, or Firm*—Helfgott & Karas, PC

[57] ABSTRACT

A CPU, a main memory, a network interface section and a control section are connected to an internal bus. The control section is connected to a storage device to control read-out and write-in processes relative to the storage device. The network interface section receives an access request to the storage device transferred through a network and sends it to the control section through the CPU. The network interface section and the control section are connected to each other by an exclusive line. Data read out of the storage device and data to be written into it is transferred through the exclusive line.

12 Claims, 16 Drawing Sheets

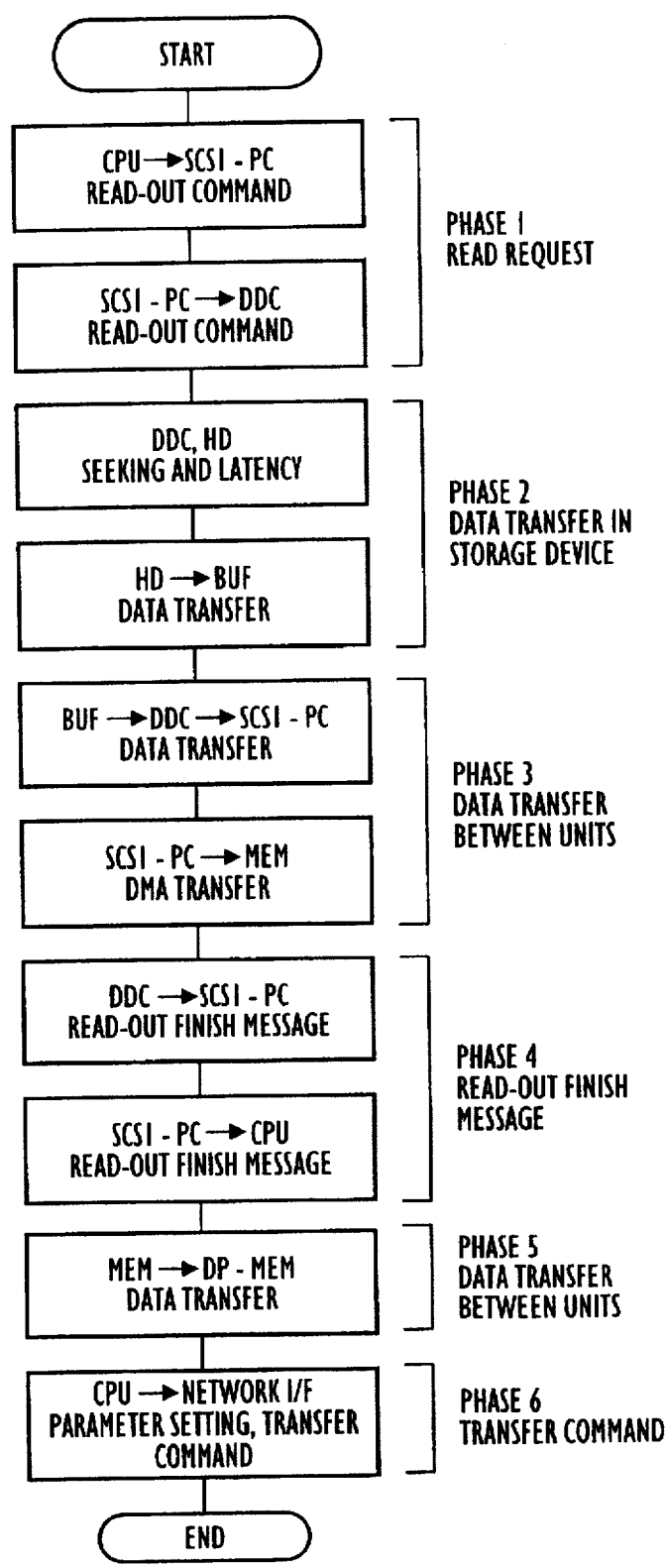

| FILE NAME | UNIT STORED ON HD | HD UNIT NUMBER | BLOCK |
|---|---|---|---|
| NEWS 1 | 0-1 MINUTE<br>  00-05 SECOND<br>  05-10<br>  10-15<br>  . . . | 1 | 0<br>1<br>2 |
| | 1-2 MINUTE<br>  00-05 SECOND<br>  05-10<br>  10-15<br>  . . . | 2 | 0<br>1<br>2 |
| | 2-3 MINUTE<br>  00-05 SECOND<br>  05-10<br>  10-15<br>  . . . | 3 | 0<br>1<br>2 |

FIG. 14

STORAGE DEVICE CONTROL SYSTEM WITH AN INTERNAL BUS WHEREIN A NETWORK INTERFACE HAS A DATA LINE FOR MEMORY TRANSFER

BACKGROUND OF THE INVENTION

1. Field of the Invention

The present invention relates to a control system for a storage device having a large capacity and, more particularly, a control system for gaining access to the storage device via a network.

2. Description of the Related Art

Recently, the storage device such as magnetic and optical disk units is used more often for storing image data, particularly moving image data. The demand is therefore to become larger and larger in capacity. In addition, access is more often gained to it through a network. In the video on-demand service, for example, moving image data and others are taken out of the storage device (or server), in response to a demand from a subscriber, and they are sent to the subscriber. In this service, data thus processed become large in volume and their transfer delay must be kept as short as possible. It is therefore required that the transfer between the storage device and its communication line is controlled at a higher efficiency.

FIG. 1 is a block diagram showing a common storage device and its control system. The memory unit 1 is a magnetic disk unit which comprises a disk drive controller DDC 11, a hard disk HD 12, and a buffer memory BUF 13, as shown in FIG. 2A. A control section 2 includes an SCSI protocol controller SCSI-PC 14 and a DMA controller 15, as shown in FIG. 2B. A CPU 3 generates a command for the control section 2, in response to an access request transferred from the user through a network interface section 4, which serves as an interface with an ATM network and which includes a bus I/F 16, a dual port memory DP-MEM 17, an ATM protocol controller 18 and a transceiver 19, as shown in FIG. 2C. A main memory MEM 5 serves to temporarily hold data when the data is written into and read out of the storage device 1.

The control section 2, the CPU 3, the network interface section 4 and the main memory 5 are connected to an internal bus 6. The storage device 1 and the control section 2 are connected to each other via a general purpose (SCSI) bus 7.

FIG. 3 is a flow chart showing a data read-out operation from the storage device, which follows after the CPU 3 receives a read request transferred from the user.

At a phase 1, a read request is transferred from the CPU 3 to the SCSI protocol controller 14 and then from the SCSI protocol controller 14 to the disk drive controller 11. At a phase 2, data transfer is conducted in the storage device 1 and data read out of the hard disk 12 is stored in the buffer memory 13. At a phase 3, the data stored in the buffer memory 13 is transferred first to the SCSI protocol controller 14 through the disk drive controller 11. It is then transferred from the SCSI protocol controller 14 to the main memory 5 through the internal bus 6, while being controlled by the DMA controller 15. DMA transfer process is used in this case.

At a phase 4, a read-out process finish message is transferred from the disk drive controller 11 to the CPU 3 via the SCSI protocol controller 14. At a phase 5, the data read out of the main memory 5 is transferred to the network interface section 4 through the internal bus 6 and written in a predetermined area in the dual port memory 17. At a phase 6, the CPU 3 sends a data transfer command to the ATM protocol controller 18 in the network interface section 4. In response to this data transfer command, the ATM protocol controller 18 reads out the data from the dual port memory 17 and the transceiver 19 transfers it to the user.

FIG. 4 is a flow chart showing a data write-in operation to the storage device. It is similar in many points as the data read-out operation in FIG. 3. Its description will be omitted accordingly.

FIG. 5 is a time chart showing how the data read-out operation in FIG. 3 progresses in the internal bus 6, the general purpose bus 7, the storage device 1 and the network interface section 4. Thick lines represent that the components are operating (or occupied in the case of buses). Reference numerals 1–6 correspond to phases 1–6 in FIG. 3. It can therefore be understood that the internal bus 6, for example, is occupied at the phase 1 and at phases 3–6. The length of a thick line along the horizontal axis represents a period of time. It can be easily understood that the process time period of the phase 2 is long comparing to other phases.

FIG. 6 is a block diagram showing a large-capacity storage apparatus and its control system provided with plural storage devices. In FIG. 6, each of storage devices 21-1–21-3 corresponds to the storage device 1 in FIG. 1. A control section 22 is connected to the plural storage devices 21-1–21-3 via a general purpose bus 7 to control them through the SCSI protocol.

When the storage apparatus is provided with plural storage devices like this, a scheduling process is needed to appoint the order of accesses to these storage devices. However, data read-out and write-in operations relative to each of them are fundamentally the same as those shown in FIGS. 3 and 4.

The scheduling process is as follows. A timer 23 interrupts the CPU 3 at predetermined time periods. Every time it receives an interrupt, the CPU 3 changes the storage device to which access is to be gained, and access is thus gained to the three storage devices 21-1–21-3 sequentially.

FIG. 7 is a time chart showing how the data read-out operation in FIG. 6 progresses in the internal bus 6, the general purpose bus 7, the storage devices 21-1–21-3 and the network interface section 4.

The CPU 3 issues a data read request at a time T1, demanding data read-out from the storage device 21-1. The storage device 21-1 is brought into the phase 2 by this read request. The process time period of phase 2 is longer than for the other phases. When the storage device 21-1 is in the phase 2, therefore, the CPU 3 issues another data read request at a time T2, demanding data read-out from the storage device 21-2. The storage device 21-2 is brought into the phase 2 by this subsequent data read request. Similarly, it issues a further data read request at a time T3, demanding data read-out from the storage device 21-3. Thereafter, it issues data read requests to the storage devices 21-1–21-3 sequentially.

According to this scheduling process, data transfer from another storage device to the main memory 5 (phase 3) or from the main memory 5 to the network interface section 4 (phase 5) can be carried out when data transfer is being conducted in a storage device (phase 2). This enables data read-out speed to be made higher, the same can also be said for the data write-in process.

In the arrangement shown in FIG. 6, however, the internal bus 6 is occupied at all times, as shown in FIG. 7. The CPU 3, therefore, cannot conduct any other processes except those of gaining access to the storage devices. When the user connected to the network wants the CPU 3 to process an arithmetical calculation, for example, he or she must use the internal bus 6 to send a process request from the network interface section 4 to the CPU 3 and to transfer data between the network interface section 4 and the main memory 5. During the time when data is being read out of the storage devices, however, he cannot carry out any of these processes, since the internal bus 6 is occupied.

In the arrangement shown in FIG. 1, data read-out and write-in speeds relative to the storage device are low. Particularly when data is transferred through a high speed network such as the ATM network, data transfer capacity between the storage device 1 and the network interface section 4 becomes smaller than the transmission capacity of the network. A service that satisfies the user cannot be provided, even though a high speed network is used.

SUMMARY OF THE INVENTION

An object of the present invention is therefore to provide a control system enabling access to a storage device at a higher efficiency.

A storage device control system according to the present invention controls data read process and data write process relative to a storage unit. A CPU, a main memory, a control section and an interface section are connected to an internal bus. The control section controls the processes of reading data from the storage unit and writing data into the storage unit. The interface section sends a read request or write request to the control section through the internal bus, in response to an access request to the storage unit received from the network. The interface section also serves as an interface with the network. In this configuration, the control section and interface section are connected to each other via a data line. Data read from the storage unit and data to be written into the storage unit is transferred through the data line. A DMA transfer process is used in this case.

BRIEF DESCRIPTION OF THE DRAWINGS

FIG. 3 is a flow chart showing a data read-out operation from the storage device;

FIG. 14 is an example of the table provided when a program is divided and stored in plural storage devices;

DETAILED DESCRIPTION OF THE PREFERRED EMBODIMENTS

Figure 1:
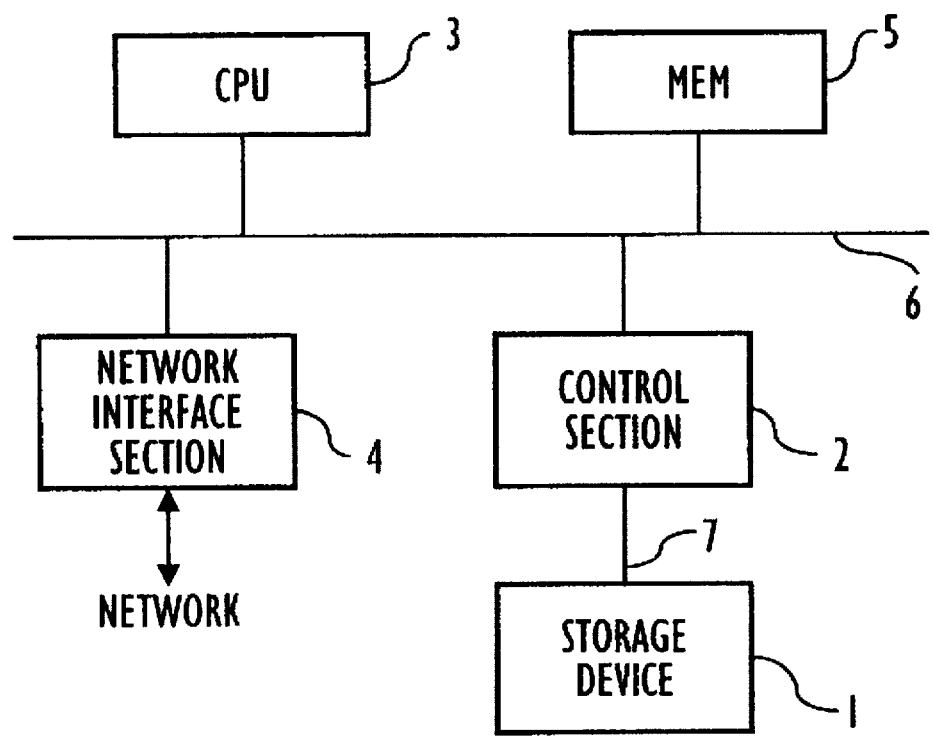
FIG. 1 is a block diagram showing a storage device and its control system in a prior art.
Figure 2A:
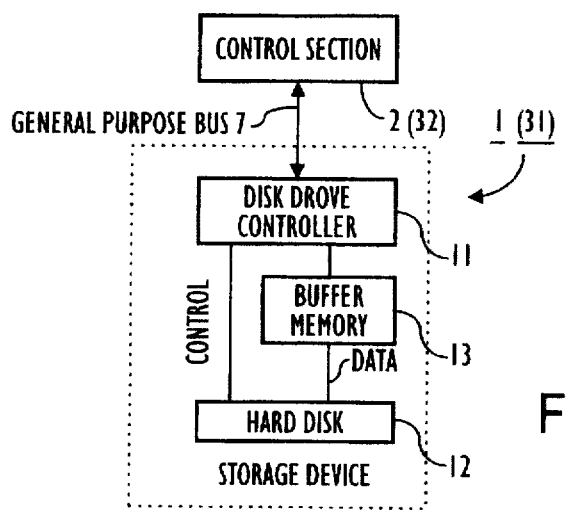
FIG. 2A is a block diagram showing the storage device, FIG. 2B a block diagram showing a control section, and FIG. 2C a block diagram showing a network interface section.
Figure 2B:
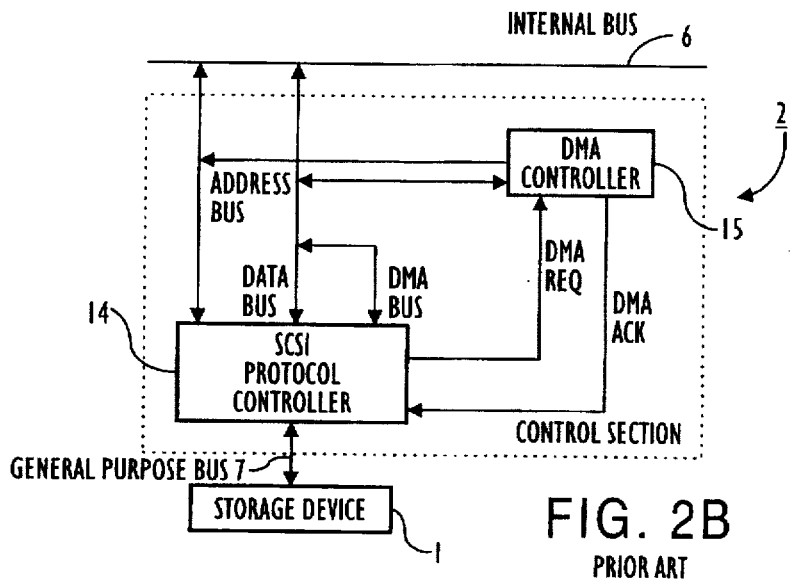
Figure 2C:
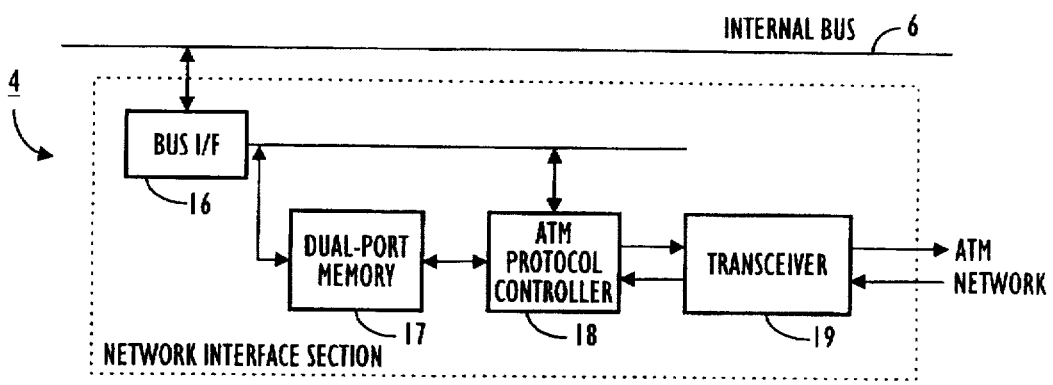
Figure 4:
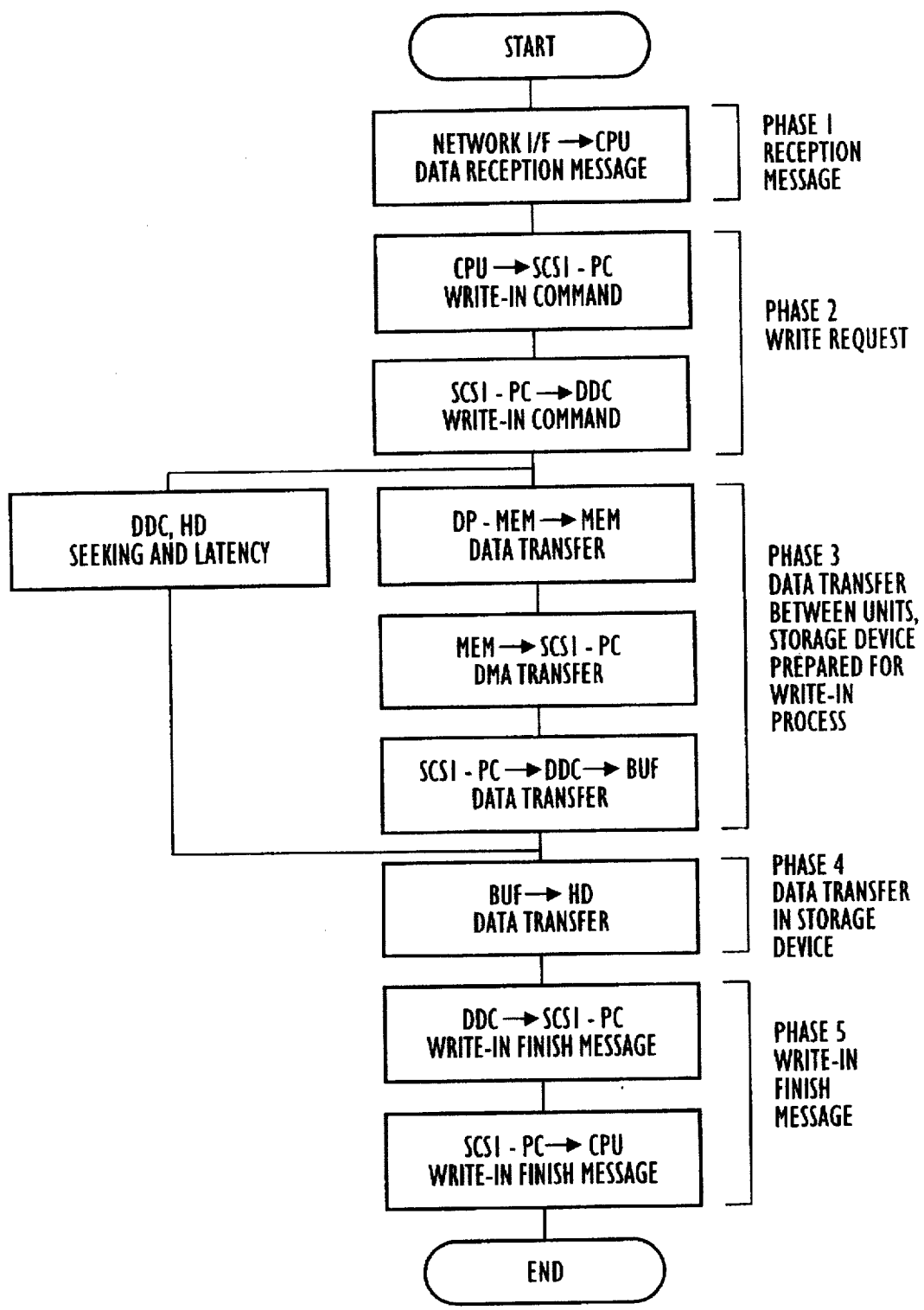
FIG. 4 is a flow chart showing a data write-in operation to the storage device.
Figure 8:
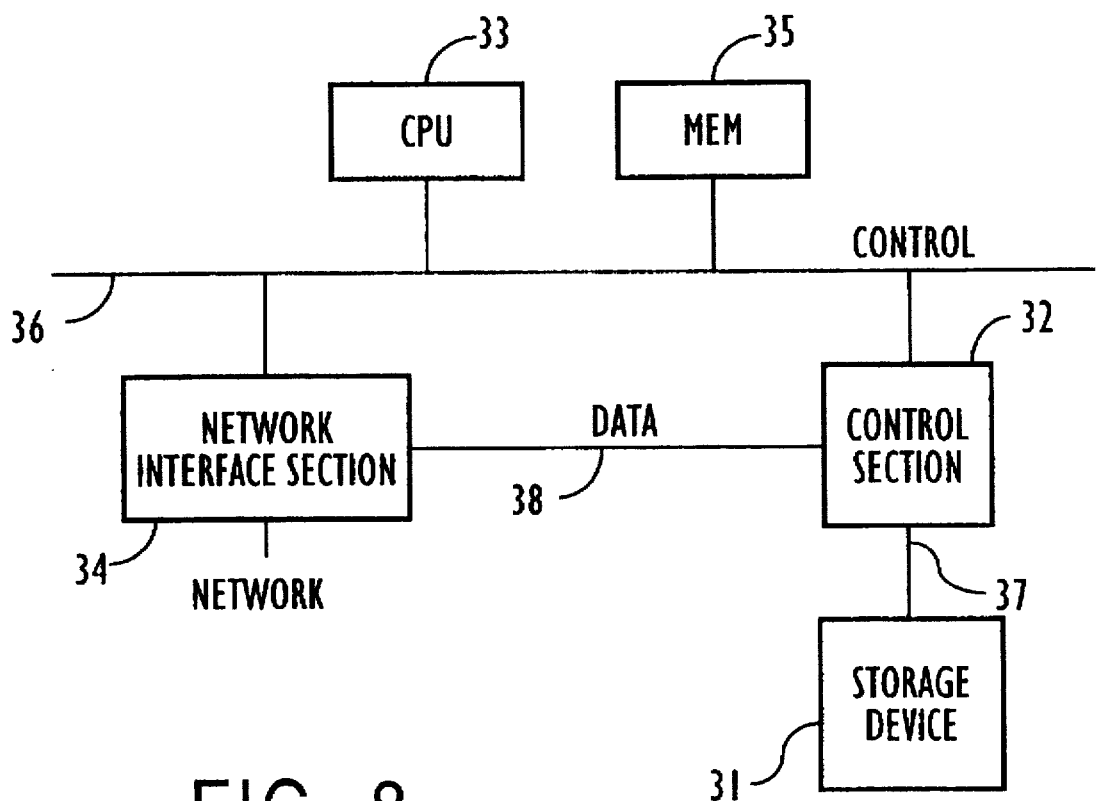
FIG. 8 is a block diagram showing a storage device control system according to the present invention.

FIG. 8 is a block diagram showing a storage device control system according to the present invention. A storage device 31 is of the magnetic disk type which has the same arrangement as shown in FIG. 2A. It includes the disk drive controller DDC 11, the hard disk HD 12 and the buffer memory BUF 13. It reads and writes data from and onto the hard disk 12, in response to a command received from a control section 32.

The control section 32 is connected to an internal bus 36. The control section 32 and the storage device 31 are connected to each other via a general purpose (SCSI) bus 37. The control section 32 controls the storage device 31 through the SCSI protocol, in response to a command received from the CPU 33.

The CPU 33 is connected to the internal bus 36. It generates a command for the control section 32, in response to an access request transferred from the user through a network interface section 34. The network interface section 34 is connected to the internal bus 36. It serves as an interface with the network, the ATM network in this case. A main memory MEM 35 is connected to the internal bus 36 and it is used as a working area for the CPU 33.

An exclusive line 38 connects the control section 32 and the network interface section 34 to each other. It comprises data and address buses and an R/W command line.

When the user takes data out of the storage device 31 through the network, his read request is received by the network interface section 34, which sends his request to the CPU 33 through the internal bus 36. The CPU 33 transfers his read request to the control section 32 through the internal bus 36. The control section 32 reads data out of the storage device 31, in response to the read request, and transfers the data to the network interface section 34 through the exclusive line 38. The network interface section 34 transfers the data to the user through the network.

As described above, in this system, a control signal for data read process is transferred through the internal bus 36 and data thus read from the storage device 31 is transferred through the exclusive line 38. The operation or process of writing data into the storage device 31 is fundamentally the same as the above-described read-out process. In short, a control signal is transferred through the internal bus 36 while write-in data is transferred through the exclusive line 38.

Figure 9:
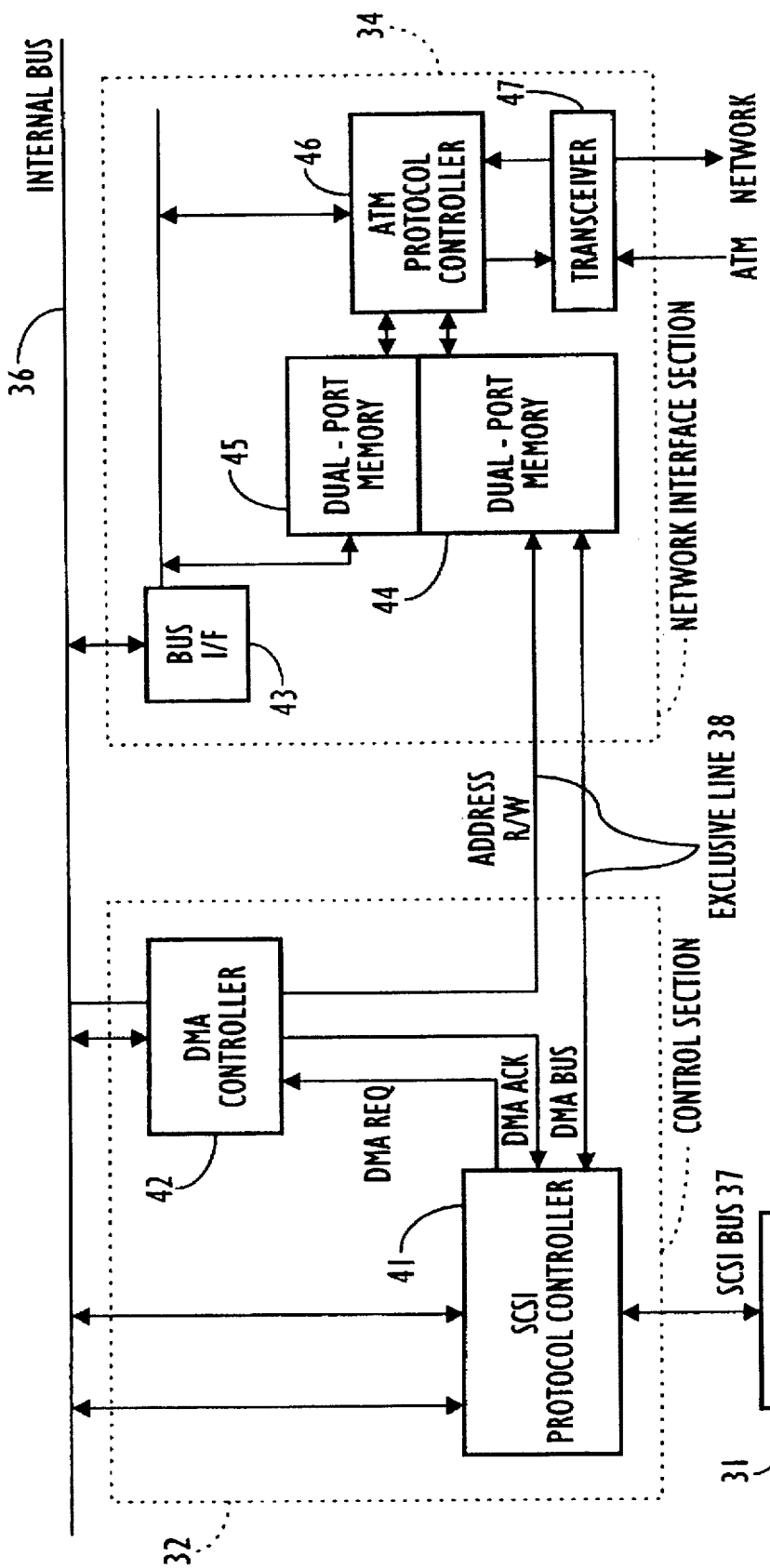
FIG. 9 is a block diagram showing control and network interface sections.

FIG. 9 is a block diagram showing the control section 32 and the network interface section 34. The control section 32 includes an SCSI protocol controller SCSI-PC 41 and a DMA controller 42. The network interface section 34 includes the bus I/F 43, dual port memories DP-MEM 44 and 45, an ATM protocol controller 46 and a transceiver 47. The operation of each component shown in FIG. 9 will be described, referring to flow charts in FIGS. 10 and 12.

Figure 10:
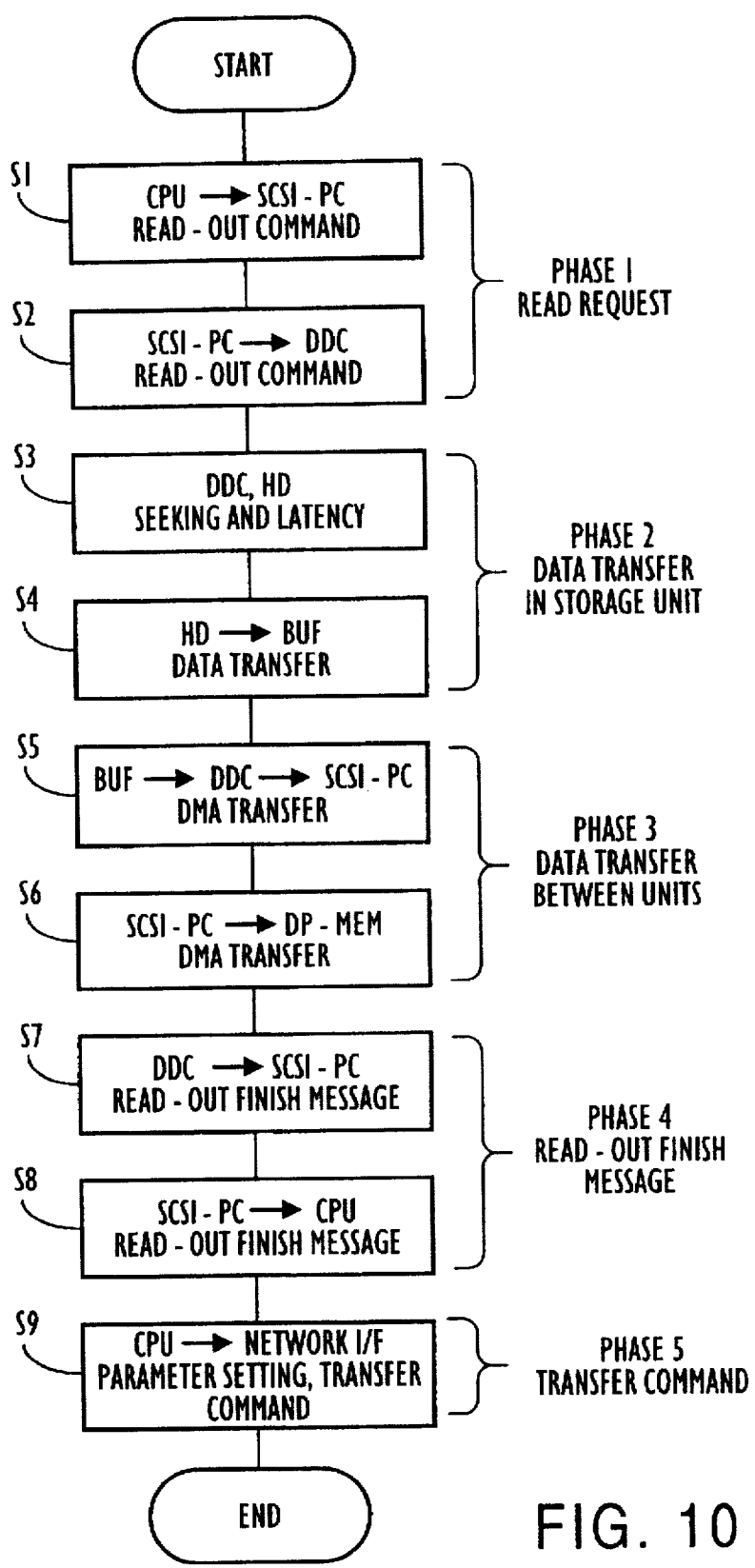
FIG. 10 is a flow chart showing the process of transferring data read out of the storage devices to the user through the network.

FIG. 10 is a flow chart showing the operation of transferring data read out of the storage device 31 to the user through the network. This operation is carried out after a data read request transferred from the user is received by the network interface section 34 and then sent to the CPU 33. The read request represents that the user demands his desired program to be sent to him in the video on-demand service, for example.

The phase 1 relates to the read request process, which comprises steps S1 and S2. At the step S1, the read request is transferred from the CPU 33 to the SCSI protocol controller 41 in the control section 32 through the internal bus 36. This read request includes information for identifying the data to be read out. It includes program identifying information in the video on-demand service, for example.

At the step S2, the read request is transferred from the SCSI protocol controller 41 to the disk drive controller DDC 11 in the storage device 31 through the SCSI bus 37. The SCSI protocol controller 41 recognizes the relationship of the data stored on the hard disk HD 12 to a block number with which the data is stored. It transfers the block number on the hard disk 12 to the disk drive controller 11, in response to the read request received from the CPU The phase 2 relates to the data transfer process in the storage device, which comprises steps S3 and S4. The step S3 relates to the seek and latency process of the hard disk 12. At the step S4, data read out of the hard disk 12 is transferred to the buffer memory BUF 13 in the storage device 31 under the control of the disk drive controller 11.

The phase 3 relates to the data transfer process between units, which comprises steps S5 and S6. At the step S5, the disk drive controller 11 reads out data stored in the buffer memory 13 and transfers it to the SCSI protocol controller 41 through the SCSI bus 37.

At the step S6, the SCSI protocol controller 41 sends a DMA transmission request to the DMA controller 42, which transfers an acknowledgment message to the SCSI protocol controller 41, in response to a command received from the CPU 33, and stores a write-in address in the dual port memory 44 in the network interface section 34. The DMA controller 42 transfers a R/W signal, which represents "write-in", and the write-in address to the dual port memory 44. The SCSI protocol controller 41 transfers data read out of the storage device 31 to the dual port memory 44. The data read out of the storage device 31 is thus written in the dual port memory 44.

The phase 4 relates to the process for informing of data read-out finish, which comprises steps S7 and S8. At the step S7, the disk drive controller 11 in the storage device 31 informs the SCSI protocol controller 41 of the data read-out finish. At the step S8, the data read-out finish is informed from the SCSI protocol controller 41 to the CPU 33 through the internal bus 36.

The phase 5 relates to the data transfer command process, which comprises a step S9. At the step S9, the CPU 33 send a transfer command to the network interface section 34 and sets a parameter. This information is transferred through the internal bus 36 and written in the dual port memory 45. The parameter includes identification information representing the address in the dual port memory 44 in which the data has been written at the step S6, and a data transfer destination.

Thereafter, ATM protocol controller 46 reads the parameter from the dual port memory 45 and reads data out of the dual port memory 44, according to the parameter. An address space is logically allotted to the dual port memories 44 and 45, and the ATM protocol controller 46 can use the logical address to gain access to them.

ATM protocol controller 46 divides the data read out of the dual port memory 44 into predetermined lengths, stores them as a payload of cells and sends them to the transceiver 47 while adding VPI/VCI information, by which the route to the transfer destination is appointed, to a header of each cell.

Figure 11:
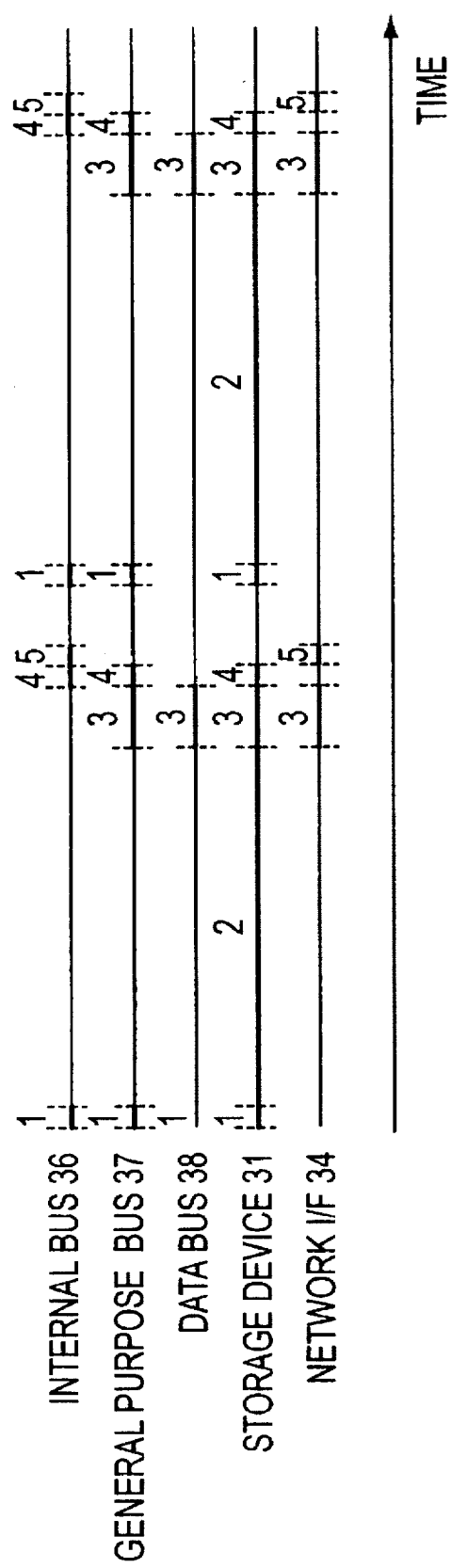
FIG. 11 is a time chart showing how the data read-out process in FIG. 10 progresses in the bus and other components.

FIG. 11 is a time chart showing how the read-out process in FIG. 10 progresses in the internal bus 36, the SCSI bus 37, the data bus of the exclusive line 38, the storage device 31 and the network interface section 34. The time period shown by a thick line denotes that each component is operating (or the bus is occupied). Reference numerals 1–5 correspond to the phases 1–5 in FIG. 10. The internal bus 36, for example, is occupied at phases 1, 4 and 5. Time is plotted on the horizontal axis.

Figure 5:
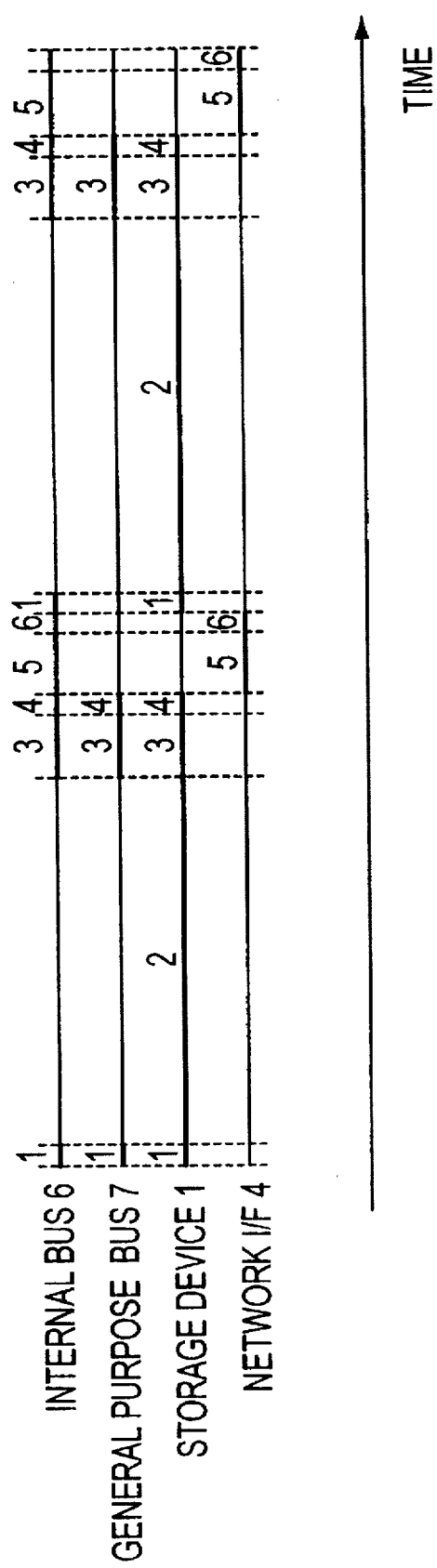
FIG. 5 is a time chart showing how the data read-out process in FIG. 1 progresses in the bus and other components.

As is apparent from the comparison of FIG. 11 with FIG. 5, the main memory 5 was used in the conventional case when data was transferred from the control section 2 to the network interface section 4. Two cycles (or phases 3 and 5), therefore, were needed for transferring the data from the control section 2 to the network interface section 4. The internal bus 6 was used for both of these cycles, and this caused the internal bus 6 to be occupied for a longer time.

In the system of the present invention, however, only one cycle (or phase 3) is needed when data is transferred from the control section 32 to the network interface section 34. This enables processing time to be made shorter. In addition, the data is transferred through the data bus of the exclusive line 38. The time during which the internal bus 36 is occupied can be thus made shorter. Further, no control is needed to obtain the right of using the internal bus 36 for transferring the data. This makes the data transfer speed higher.

Figure 12:
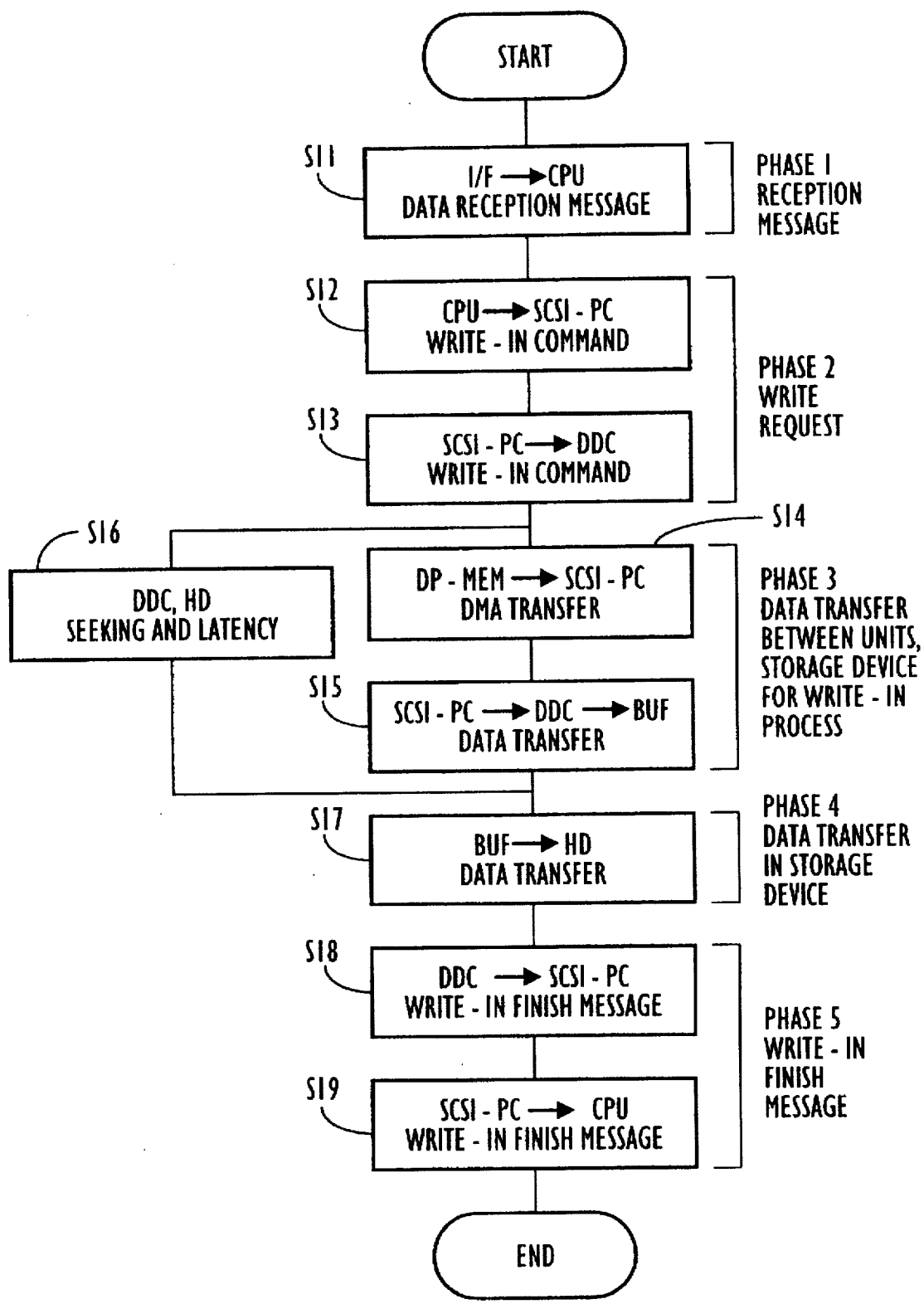
FIG. 12 is a flow chart showing the process of writing data transferred through the network into the storage devices.

FIG. 12 is a flow chart showing the operation of writing data, which is transferred through the network, into the storage device 31. This operation is carried out after the network interface section 34 receives a write-in command and associated data, and stores them in the dual port memory 44.

The phase 1 relates to data reception informing process, which comprises a step S11. At the step S11, data reception is informed from the network interface section 34 to the CPU 33 through the internal bus 36.

The phase 2 relates to a write request process, which comprises steps S12 and S13. At the step S12, the write request is informed from the CPU 33 to the SCSI protocol controller 41 in the control section 32 through the internal bus 36. At the step S13, the write request is informed from the SCSI protocol controller 41 to the disk drive controller 11 in the storage device 31 through the SCSI bus 37.

The phase 3 relates to a data transfer process between units, which comprises steps S14–S16. At the step S14, the SCSI protocol controller 41 which has received the write request informs the DMA controller 42 of the DMA transmission request. Following the command from the CPU 33, the DMA controller 42 transfers an acknowledgment message to the SCSI protocol controller 41. It also receives the address in the dual port memory 44, in which the data received from the network is stored, from the CPU 33 and transfers the address and R/W signal, which denotes "read-out", to the dual port memory 44. The data received from the network is thus read out of the dual port memory 44 and transferred to the SCSI protocol controller 41 through the data bus of the exclusive line 38.

At the step S15, the SCSI protocol controller 41 transfers the data read out of the dual port memory 44 to the disk drive controller 11, which writes the data in the buffer memory 13.

The step S16 relates to seeking and latency process of the hard disk 12 which is activated, following the write-in command received at the step S13. It is carried out in parallel with the steps S14 and S15.

The phase 4 relates to a data transfer process in the storage device, which comprises a step S17. At the step S17, the data stored in the buffer memory 13 is written on the hard disk 12 under the control of the disk drive controller 11.

The phase 5 relates to a write-in finish informing process, which comprises steps S18 and S19. At the step S18, the write-in finish message is transferred from the disk drive controller 11 to the SCSI protocol controller 41. At the step S19, write-in finish message is transferred from the SCSI protocol controller 41 to the CPU 33.

Data received from the network is written in the storage device, as described above. When data is transferred from the network interface section 34 to the control section 32 in this write-in process, only one cycle (or phase 3) is needed. This enables processing time to be made shorter. In addition, the data is transferred through the data bus of the exclusive line 38. This also enables the time during which the internal bus 36 is occupied to be made shorter. These merits are the same as those achieved in the read- out process.

Figure 13:
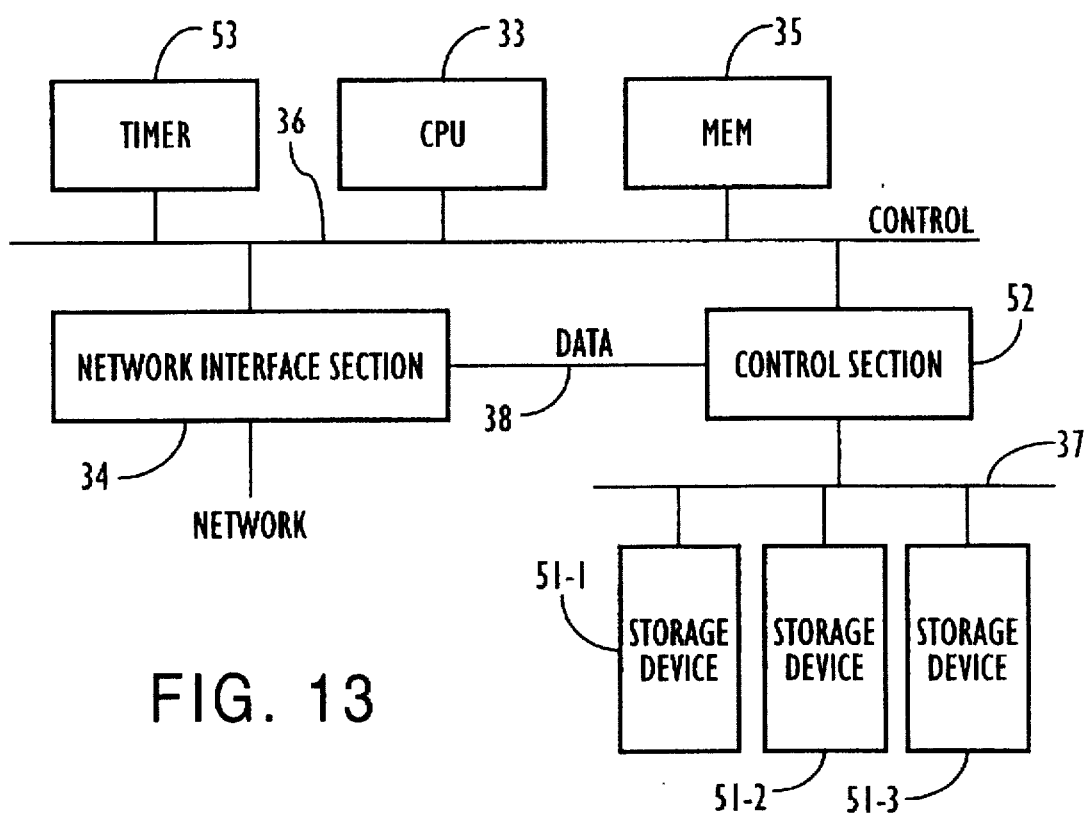
FIG. 13 is a block diagram showing another large-capacity storage apparatus and its control system provided with plural storage devices.

FIG. 13 is a block diagram showing a large-capacity storage apparatus and its control system provided with plural storage devices. In FIG. 13, each of storage devices 51-1–51-3 corresponds to the storage device 31 shown in FIG. 8, and has the same arrangement as shown in FIG. 2A. A control section 52 is connected to the storage devices 51-1–51-3 through the general purpose bus 37 and each of the storage devices is controlled by the SCSI protocol. Accesses (or read-out and write-in processes) gained to each of them are fundamentally the same as those in the above-described cases.

The large-capacity storage apparatus shown in FIG. 13 is used as a server or data base in the video on-demand service, for example. The case where it is used as the server in the video on-demand service will be described below.

Data is stored according to the striping technique in the system provided with plural storage devices. In short, a program (or a movie, for example) is divided into a number of small data units, which are allotted and stored in the storage devices, respectively. FIG. 14 shows an example of a table formed when a program is allotted to and stored in the storage devices 51-1–51-3, respectively. This table is provided in the SCSI protocol controller 41.

According to the SCSI standards, hard disks (to which 1, 2 and 3 are allotted as their unit numbers) of the storage devices 51-1–51-3 are treated as a collection of blocks arranged in an address space.

The example shown in FIG. 14 is a table relating to the image data of a program called "news 1". The image data is divided every minute and stored in the storage devices 51-1–51-3 sequentially. Image data are stored in 5-second blocks on the hard disk of each storage device.

It will be described how "news 1", stored in the storage devices 51-1–51-3, is read out by the system shown in FIG. 13.

Figure 6:
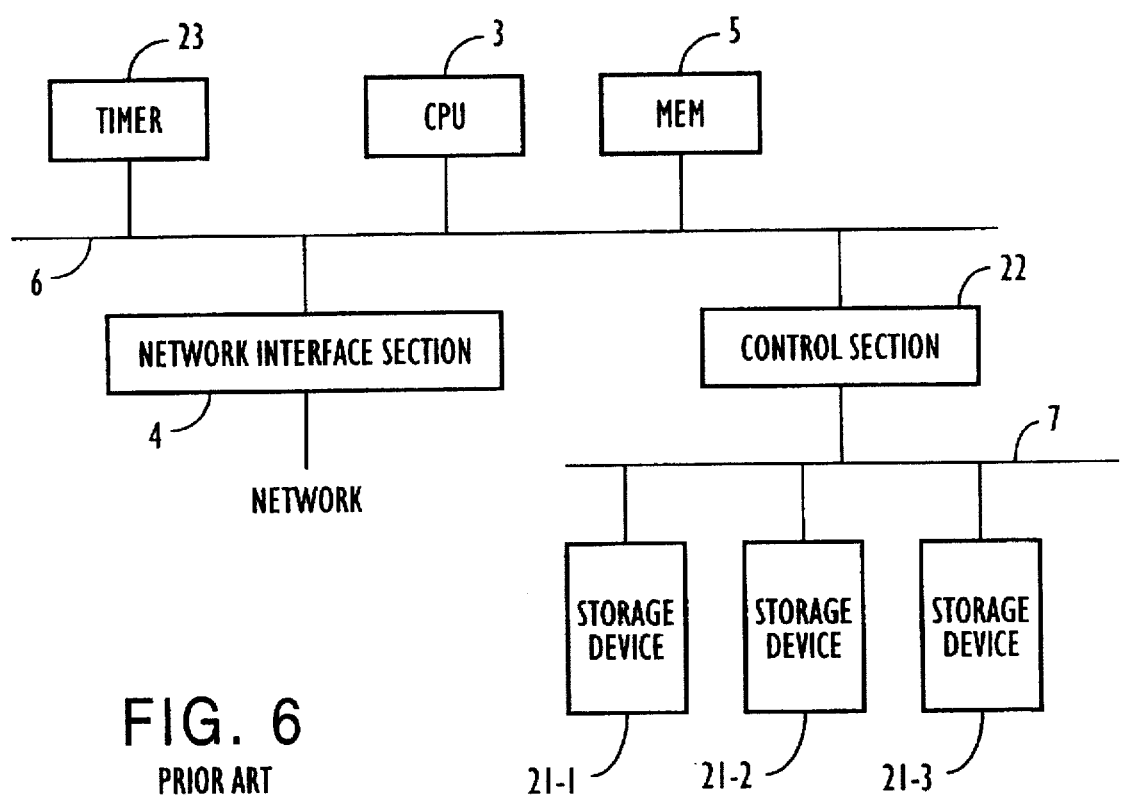
FIG. 6 is a block diagram showing a large-capacity storage apparatus and its control system provided with plural storage devices.

The CPU 33 and the control section 52 carry out a scheduling process to appropriately gain access to the storage devices 51-1–51-3. This scheduling process is the same as that described with reference to FIG. 6. A timer 53 interrupts the CPU 33 at predetermined time periods. Every time it receives a timer-interrupt, the CPU 33 sends a read-out command to the control section 52. Every time this read-out command is received, the table shown in FIG. 14 is referred to and a storage device to which access is to be gained is recognized by the control section 52. The storage device to which access is to be gained is changed over in this manner and image data of "news 1" is taken out of the storage devices 51-1–51-3 sequentially.

Figure 15:
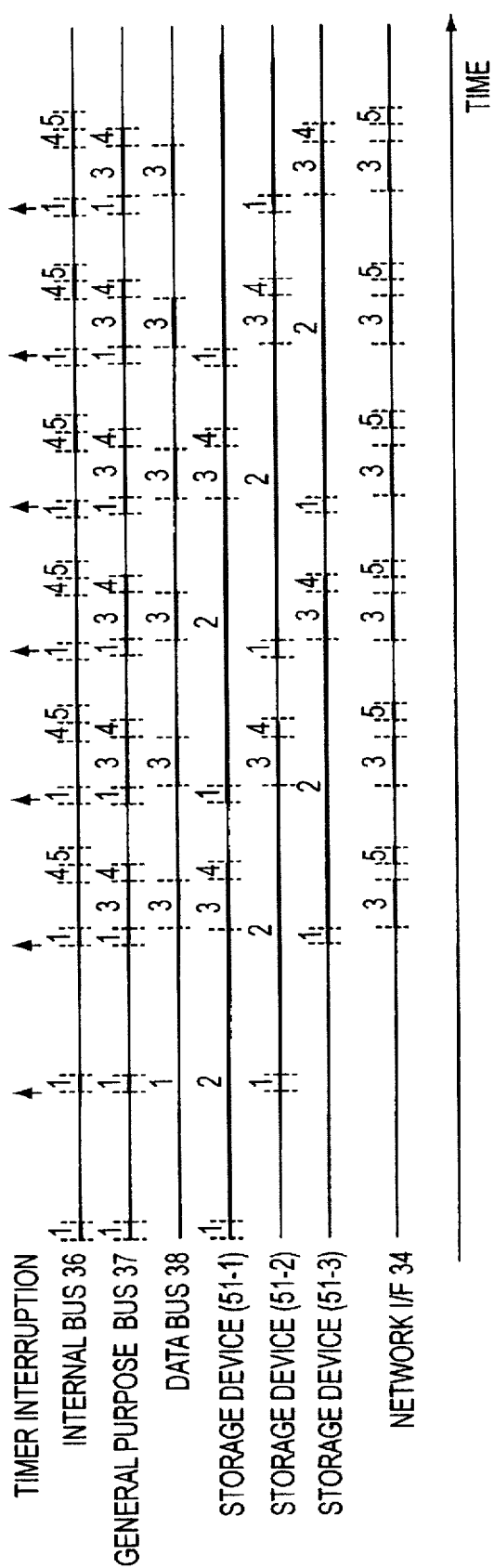
FIG. 15 is a time chart showing how the data read-out process in FIG. 13 progresses in the bus and other components.

FIG. 15 is a time chart showing how the read-out process progresses in the internal bus 36, the SCSI bus (or general purpose bus) 37, the data bus of the exclusive line 38, the storage devices 51-1–51-3 and the network interface section 34. In FIG. 15, each component is operating (or each bus is occupied) during the time period shown by a thick line.

As shown in FIG. 15, access to another storage device is started during the time period in which the data transfer process (or phase 3) is being carried out in a storage device. The timing of this access is associated with the timer interruption signal received by the CPU 33. This read-out process is the same as that described with reference to FIG. 7.

Figure 7:
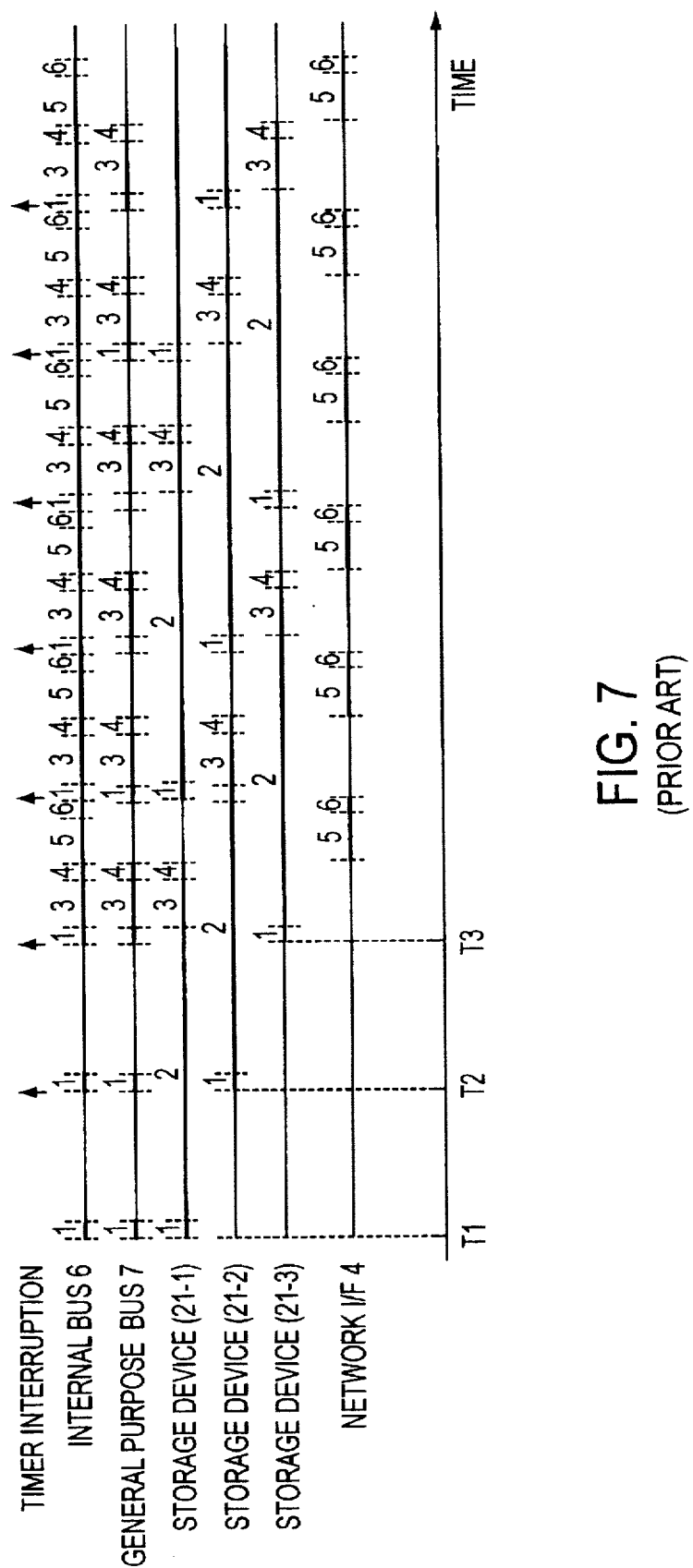
FIG. 7 is a time chart showing how the data read-out process in FIG. 6 progresses in the bus and other components.

Compare FIG. 15, in which the process attained by the system of the present invention is shown, with FIG. 7, in which the process attained by the conventional system is shown. When data was transferred from the control section 22 to the network interface section 4 in the conventional system, the main memory 5 was used, thereby causing two cycles (or phases 3 and 5) to be needed. The internal bus 6 was used for both of these cycles. Accordingly the time during which the internal bus 6 was occupied became longer. The internal bus 6 is occupied at all times in FIG. 7. Therefore, the CPU 33 cannot conduct any other process during the time period when data is being read out of the storage device.

When data is transferred from the control section 52 to the network interface section 34 in the system of the present invention, however, only one cycle (or phase 3) is needed, thereby making the processing time shorter. In addition, the data is transferred through the data bus of the exclusive line 38. Even during the time period when data is being read out of the storage devices, therefore, the CPU 33 can conduct any of other processes. Calculations, word-processing or games, for example, can be conducted while data is being read out of the storage devices.

As shown in FIG. 15, the internal bus 36, the data bus of the exclusive line 38 and the network interface section 34 are kept unused for some time. Thus, the data transferring speed can be made higher.

When data transferred from the network is to be written into the storage devices 51-1–51-3 in the system shown in FIG. 13, the write-in process is the same as that described with reference to FIG. 12.

Figure 16:
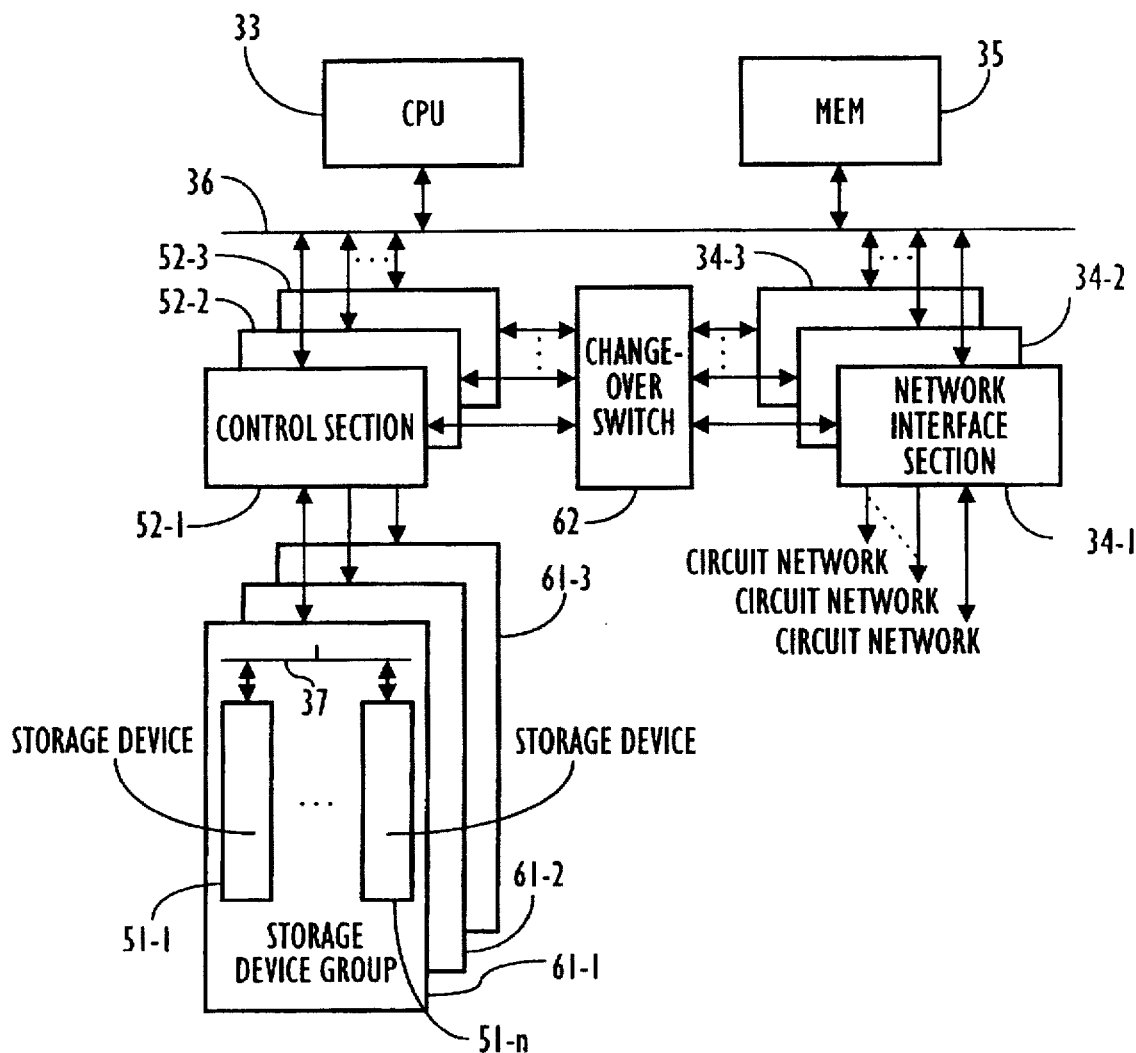
FIG. 16 is a block diagram showing another storage device control system according to the present invention.

FIG. 16 is a block diagram showing a further storage device control system according to the present invention. Each of network interface sections 34-1–34-3 corresponds to the network interface section 34 in FIG. 13, and each of control sections 52-1–52-3 to the control section 52.

The control sections 52-1–52-3 control their corresponding storage device groups 61-1–61-3. Each of the storage device groups 61-1–61-3 includes one or plural storage devices. Storage devices in each storage device group are connected to one another through the general purpose bus 37.

Network interface sections 34-1–34-3 and control sections 52-1–52-3 are connected to each other by a changeover switch 62. In short, each of the network interface sections 34-1–34-3 can gain access to an optional one of the storage device groups 61-1–61-3.

When the user connected to the network interface section 34-1 wants to see a program "movie 1" stored in the storage device group 61-3, he transfers information, by which "movie 1" can be recognized, and a down-load request through the network. When the network interface section 34-1 receives this information, it sends the down-load distribution request of "movie 1" to the CPU 33.

A control table showing which data is stored in which storage device group is provided in the main memory 35. When the CPU 33 recognizes that "movie 1" is stored in the storage device 61-3, by referring to the control table, it commands the changeover switch 62 to connect the network interface section 34-1 and the control section 52-3 to each other. In response to the command, the changeover switch 62 connects them to form a data bus between them. The following process is the same as that attained by the system in FIG. 13. In short, data thus read out of the storage device is transferred through the data bus formed by the changeover switch 62.

Although three control sections and three network interface sections have been provided in the system shown in FIG. 16, the number is optional. In short, an optional number of control sections and an optional number of network interface sections may be connected by the changeover switch.

Although the control table has been provided in the main memory in the above-described system, it may be provided in the internal memory of the CPU 33 or in each of the control sections.

Although the control sections and the network interface sections have been connected by the changeover switch in the above-described system, they may be connected by a high speed bus, or they may be connected in a mesh.

Although data stored in each of the storage devices has been transferred to the user, in response to his read request, the present invention can also be applied to a case where spontaneous data transfer is carried out according to a predetermined program executed by the CPU.

According to the storage device control system of the present invention as described above, the control section, which controls the storage device, and the network interface section, which has an interface with the network, are connected through an exclusive line, and data read out of the storage device and data to be written into the storage device are transferred through the exclusive line. Therefore, the efficiency of the read-out and write-in processes can be increased to a greater extent, and the data transfer speed can be made higher. The system can be thus made more suitable for various kinds of services in which high speed networks are used.

Further, plural storage devices are provided, and plural control sections, which control these plural storage devices, and plural network interface sections, which interface with the network, are connected by a changeover switch. The system can thus more flexibly meet the demands of a greater number of users, and it also enables data transfer to be made at a higher speed.

What is claimed is:

1. A storage device control system for controlling data read process or data write process, comprising:
storing means for storing data;
an internal bus;
control means, connected to said internal bus, for controlling reading data from said storing means or writing data to said storing means;
interface means, connect to said internal bus, for interfacing with a network and for sending a read request or a write request to said control means through said internal bus, in response to an access request to said storing means received from the network; and
a data line for connecting said control means and said interface means to each other to transfer data read from said storing means or data to be written to said storing means.

2. The storage device control system according to claim 1, further comprising DMA control means for controlling data transfer between said control means and said interface means.

3. The storage device control system according to claim 2, wherein said interface means has a memory for storing data read from said storing means or data to be written to said storing means, and said DMA control means controls writing data to the memory or reading data from the memory.

4. The storage device control system according to claim 1, wherein said storing means includes a plurality of storage devices.

5. The storage device control system according to claim 4, wherein said control means sequentially accesses the plurality of storage devices.

6. The storage device control system according to claim 1, wherein said storing means includes a storing medium and a buffer memory and data transfer between the storing medium and said control means is made through the buffer memory.

7. A storage device control system for controlling data read process or data write process, comprising:
storing means for storing data;
control means for controlling reading data from said storing means or writing data to said storing means;
an internal bus;
interface means, connected to said internal bus, for interfacing with a network and for sending a read request or a write request to said control means through said internal bus, in response to an access request to said storing means received from the network; and
a control line for connecting said control means and said interface means to each other to transfer the read request or the write request; and
a data line for connecting said control means and said interface means each other to transfer data read from said storing means or data to be written to said storing means.

8. A storage device control system for controlling data read process or data write process, comprising:
storing means for storing data;
an internal bus;
control means, connected to said internal bus, for controlling reading data from said storing means;
a CPU, connected to said internal bus, transmitting a read request to said control means via said internal bus;
interface means for interfacing with a network; and
a data line for connecting said control means and said interface means to each other to transfer data read from said storing means.

9. A storage device control system for controlling data read process or data write process, comprising:

a plurality of storing means for storing data;

an internal bus;

a plurality of control means, each connected to said internal bus, and each provided for corresponding one of said plurality of storing means, for controlling reading data from said corresponding storing means or writing data to said corresponding storing means;

a plurality of interface means, each connected to said internal bus, for interfacing with a network and for sending a read request or a write request to said plurality of control means through said internal bus in response to one of an access request to said plurality of storing means received from the network; and switching means for selectively connecting said plurality of control means and said plurality of interface means to transfer data read from said plurality of storing means or data to be written to said plurality of storing means.

10. A data read control method, performed in a storage device control system, where a control unit for controlling an access to a storage unit and an interface unit for interfacing with a network are connected to an inner bus, said data read control method comprising steps of:

receiving a read request for reading data from the storage unit transmitted from the network;

transmitting the read request from the interface unit to the control unit via the inner bus;

reading data from the storage unit according to the read request;

providing a data line between the control unit and the interface unit;

transmitting the data from the control unit to the interface unit via the data line; and outputting the data to the network.

11. A data write control method, performed in a storage device control system, where a control unit for controlling an access to a storage unit and an interface unit for interfacing with a network are connected to an inner bus, said data write control method comprising steps of:

receiving a write request for writing data to the storage unit and data to be written to the storage unit transmitted from the network;

transmitting the write request from the interface unit to the control unit via the inner bus;

providing a data line between the interface unit and the control unit;

transmitting the data from the interface unit to the control unit via the data line; and writing the data to the storage unit according to the write request.

12. A data read control method, performed in a storage device control system, where a CPU, a control unit for controlling an access to a storage unit and an interface unit for interfacing with a network are connected to an inner bus, said data read control method comprising steps of:

transmitting a read request for reading data from the storage unit issued by the CPU to the control unit via the inner bus;

reading data from the storage unit according to the read request;

providing a data line between the control unit and the interface unit;

transmitting the data from the control unit to the interface unit via the data line;

transmitting a transfer request issued by the CPU to the interface unit via the inner bus; and outputting the data to the network according to the transfer request.

* * * * *

UNITED STATES PATENT AND TRADEMARK OFFICE
CERTIFICATE OF CORRECTION

| | | |
|---|---|---|
| PATENT NO. | : | 5,737,634 |
| DATED | : | APRIL 7, 1998 |
| INVENTOR(S) | : | Takashi HAMANO et al |

It is certified that error appears in the above-indentified patent and that said Letters Patent is hereby corrected as shown below:

On sheet 8 of 16 of the drawings, FIG. 8, delete "PRIOR ART" legend.

Signed and Sealed this

Thirtieth Day of June, 1998

*Attest:*

BRUCE LEHMAN

*Attesting Officer*    *Commissioner of Patents and Trademarks*